United States Patent
Hanrahan et al.

(10) Patent No.: US 12,226,974 B2
(45) Date of Patent: Feb. 18, 2025

(54) METHOD FOR MANUFACTURING A WIND TURBINE BLADE AND WIND TURBINE BLADE OBTAINED THEREBY

(71) Applicants: LM WIND POWER A/S, Kolding (DK); BLADE DYNAMICS LLLP, New Orleans, LA (US)

(72) Inventors: Kristen Hanrahan, New Orleans, LA (US); Tanner Knoblock, New Orleans, LA (US); Justin Hunter, New Orleans, LA (US); Jasper Knoblock, New Orleans, LA (US); Jeppe Jørgensen, Kolding (DK)

(73) Assignees: LM WIND POWER A/S, Kolding (DK); BLADE DYNAMICS LLLP, New Orleans, LA (US)

( * ) Notice: Subject to any disclaimer, the term of this patent is extended or adjusted under 35 U.S.C. 154(b) by 0 days.

(21) Appl. No.: 17/921,163

(22) PCT Filed: May 25, 2020

(86) PCT No.: PCT/EP2020/064418
§ 371 (c)(1),
(2) Date: Oct. 25, 2022

(87) PCT Pub. No.: WO2021/239209
PCT Pub. Date: Dec. 2, 2021

(65) Prior Publication Data
US 2023/0166472 A1 Jun. 1, 2023

(51) Int. Cl.
*F03D 1/06* (2006.01)
*B29C 70/52* (2006.01)
(Continued)

(52) U.S. Cl.
CPC ........ *B29D 99/0028* (2013.01); *B29C 70/523* (2013.01); *B29C 70/86* (2013.01); *F03D 1/0675* (2013.01); *F05B 2230/20* (2013.01)

(58) Field of Classification Search
None
See application file for complete search history.

(56) References Cited

U.S. PATENT DOCUMENTS 10,385,823 B2 * 8/2019 Sandercock .......... B29C 70/342
2014/0301859 A1 10/2014 Hancock et al.
(Continued)

FOREIGN PATENT DOCUMENTS

CN 210564887 U 5/2020
WO 2020091783 A1 5/2020

*Primary Examiner* — Kayla Mccaffrey
(74) *Attorney, Agent, or Firm* — Nath, Goldberg & Meyer; Jerald L. Meyer; Tanya E. Harkins

(57) ABSTRACT

A method for manufacturing a wind turbine blade, comprising the steps of:
providing one or more individual pultrusions including a first tapering end with a tapering end face terminating in a taper tip, and
arranging the one or more pultrusions in one layer or more stacked layers including at least a bottom layer on a first assembly surface at a first assembly station to provide a pultrusion arrangement extending in a longitudinal direction between a pultrusion root end and a pultrusion tip end, wherein the first tapering end of the one or more pultrusions form the pultrusion root end or the pultrusion tip end of the pultrusion arrangement.

19 Claims, 8 Drawing Sheets

(51) Int. Cl.
 *B29C 70/86* (2006.01)
 *B29D 99/00* (2010.01)

(56) References Cited

U.S. PATENT DOCUMENTS

| | | | |
|---|---|---|---|
| 2015/0224721 A1* | 8/2015 | Bendel | B29C 70/443 |
| | | | 264/553 |
| 2015/0224759 A1* | 8/2015 | Boon | B29C 70/54 |
| | | | 156/324 |
| 2017/0051718 A1* | 2/2017 | Klitgaard | B29C 70/545 |
| 2022/0055319 A1* | 2/2022 | Rodwell | B29D 99/0028 |

* cited by examiner

METHOD FOR MANUFACTURING A WIND TURBINE BLADE AND WIND TURBINE BLADE OBTAINED THEREBY

This is a National Phase Application filed under 35 U.S.C. 371 as a national stage of PCT/EP2020/064418, filed May 5, 2020, the contents of which is hereby incorporated by reference in its entirety.

TECHNICAL FIELD

The present disclosure relates to a wind turbine blade and a method for manufacturing such a wind turbine blade.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more wind turbine blades. The wind turbine blades capture kinetic energy of wind using known airfoil principles. The wind turbine blades transmit the kinetic energy in the form of rotational energy so as to turn a shaft coupling the wind turbine blades to a gearbox, or if a gearbox is not used, directly to the generator. The generator then converts the mechanical energy to electrical energy that may be deployed to a utility grid.

The wind turbine blades extend along a spanwise axis from a blade root through a root region and an airfoil region to a tip region with the blade tip, and generally comprises a suction side shell and a pressure side shell typically formed using a moulding process, such as vacuum assisted resin transfer moulding, that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the wind turbine blade during operation. Thus, to increase the stiffness, buckling resistance and strength of the wind turbine blade, the body shell is typically reinforced using one or more structural components (e.g. opposing spar caps with a shear web configured therebetween) that engage the inner pressure and suction side surfaces of the shell halves. Conventional spar caps and/or shear webs have been constructed of glass fibre laminate composites and/or carbon fibre laminate composites.

Recently, spar caps or main laminates have been constructed of pultruded composites that are stronger, have more reliable mechanical properties, and/or less expensive than traditional composites. As used herein, the terms "pultruded composites," "pultrusions," or similar are generally defined as reinforced materials (e.g. fibres or woven or braided strands) that are infused or impregnated with a resin and pulled through a heated stationary die so that the resin cures or undergoes polymerization. As such, the pultrusion process is typically characterized by the continuous process of composite materials that produces composite parts having a constant cross-section. Typically, a variable cross-section of the spar cap along the spanwise axis is desirable to accommodate different load environments at different spanwise locations. Thus, a plurality of pultrusions can be infused together in a mould to form the main laminate.

The ends of the pultruded composites, however, can create areas of local stress concentrations, thereby causing the part to delaminate. In addition, the unaltered ends may cause vacuum bag bridging issues which can lead to defects in the resulting part. Therefore, it is typical to taper the end of the pultrusion so as to provide the pultrusion end with a tapering end face terminating in a taper tip having a thickness significantly less than the bulk formed thickness. This thickness tapering of an individual pultrusion is also referred to as a "pultrusion chamfer".

The taper tip of each pultrusion is very fragile and brittle. This complicates the handling of the pultrusions. If the taper tip of the pultrusions hits some foreign object during handling, the taper tip might break off. This would be very critical since a specific (and very low) end step thickness of the taper tip is required to ensure good load transfer, and it is difficult if not impossible to repair a broken taper tip.

SUMMARY

On this background, it may be seen as an object of the present disclosure to provide a wind turbine blade and method for manufacturing such a wind turbine blade with improved load transfer between pultrusions and the remaining components of the blade and/or reduced risk of breaking the taper tip of pultrusions during handling.

One or more of these objects may be met by aspects of the present disclosure as described in the following.

A first aspect of this disclosure relates to a method for manufacturing a wind turbine blade extending along a spanwise axis from a blade root through a root region and an airfoil region to a tip region with the blade tip, the wind turbine blade comprising a pressure side, a suction side and a chord line extending between a leading edge and a trailing edge, the wind turbine blade comprising a shell providing the aerodynamic shape of the wind turbine blade and a main laminate forming a load carrying structure of the wind turbine blade, comprising the steps of:

providing one or more individual pultrusions including a first tapering end with a tapering end face terminating in a taper tip, optionally with an end step thickness in the range of 0.0 mm to 0.5 mm, and arranging the one or more pultrusions in one layer or more stacked layers including at least a bottom layer on a first assembly surface at a first assembly station to provide a pultrusion arrangement extending in a longitudinal direction between a pultrusion root end and a pultrusion tip end, wherein the first tapering end of the one or more pultrusions form the pultrusion root end or the pultrusion tip end of the pultrusion arrangement.

The one or more individual pultrusions may each be manufactured of one or more fibres or fibre bundles, preferably carbon fibres, cured together in a pultrusion mould via a first resin material in a pultrusion process.

The one or more individual pultrusions may each extend in a length direction, a width direction, and a thickness direction. The one or more individual pultrusions may be one or more individual pultruded planks.

Additionally or alternatively, a plurality of individual pultrusions may be provided and at least two bottom pultrusions may be arranged unidirectionally in the longitudinal direction and side-by-side in the bottom layer on the first assembly surface.

Additionally or alternatively, a plurality of individual pultrusions may be provided and arranged in a plurality of layers including the bottom layer, a top layer, and optionally one or more intermediate layers arranged between the top layer and the bottom layer.

Additionally or alternatively, the method may comprise a step of:
   covering the first tapering end of each pultrusions with an end cap, optionally of a foam material. Such an end cap may protect the fragile taper tip of the pultrusion.

Additionally or alternatively, the end cap may comprise a bottom part protecting a bottom side of the first tapering end and a top part protecting the tapering end face of the first tapering end.

Additionally or alternatively, the method may comprise a step of:
   removing the end cap from the first tapering end of the one or more pultrusions while the one or more pultrusions is/are on the first assembly surface.

Additionally or alternatively, the first assembly surface may form part of a tray, and the step of arranging the one or more pultrusions in one or more stacked layers including at least the bottom layer on the first assembly surface at the first assembly station may comprise:
   arranging the one or more pultrusions in one layer or more stacked layers including at least a bottom layer onto the tray at a first assembly station to provide a pultrusion arrangement extending in a longitudinal direction between a pultrusion root end and a pultrusion tip end, wherein the tapering end of the one or more pultrusions is/are supported by the first assembly surface of the tray at a distance from an end of the tray.

By arranging the one or more pultrusions on a tray, the fragile taper tip(s) may be protected since the tray can be used to transfer the one or more pultrusions between assembly stations.

Additionally or alternatively, the tray may comprise two walls protruding from the first assembly surface on each side of the pultrusion arrangement along the length of the one or more pultrusions so as to keep the pultrusion arrangement on the tray.

The tray walls may prevent the pultrusions from sliding off the tray and thus risking damaging the fragile taper tips.

Additionally or alternatively, the method may further comprise the steps of:
   placing the pultrusion arrangement, optionally comprising carbon fibres, onto a main laminate mould surface of a main laminate mould at a second assembly station,
   infusing the pultrusion arrangement with a second resin material, optionally a vinyl ester resin, an epoxy resin, a polyurethane resin, and/or a methyl methacrylate resin, in the main laminate mould, and
   curing the pultrusion arrangement together via the second resin material to provide a main laminate.

The second assembly station may be located at a separate location from the first assembly station optionally within the same factory. The method may include transferring the pultrusion arrangement from the first assembly station to the second assembly station.

Additionally or alternatively, the method may comprise a step of:
   covering at least the taper tip and a portion of the tapering end face of the first tapering end of the one or more pultrusions in the bottom layer with a first portion of one or more protective fibre layers so that the one or more protective fibres form part of the pultrusion arrangement.

Additionally, the first portion of the one or more protective fibre layers may cover the entire tapering end face of the first tapering end of the one or more pultrusions in the bottom layer.

Additionally or alternatively, the one or more protective fibre layers may cover the entire pultrusion root end of the pultrusion arrangement and/or the entire pultrusion tip end of the pultrusion arrangement.

Additionally or alternatively, the first portion of the one or more protective fibre layers may fully envelop the pultrusion arrangement. The first portion may cover a top side, bottom side, and the first and second end of the pultrusion arrangement. Alternatively, the one or more protective fibre layers may not cover the top side of the pultrusion arrangement.

Additionally or alternatively, a second portion of the one or more protective fibre layers may extend from the taper tip of the first tapering end of the one or more pultrusions in the bottom layer away from the first tapering end of the one or more pultrusions in the bottom layer.

Additionally, the pultrusion arrangement and at least a first portion of the one or more protective fibre layers may be infused with the second resin material in the main laminate mould, and the pultrusion arrangement and the one or more protective fibre layers may be cured together via the second resin material to provide a main laminate integrated with the one or more protective fibre layers.

Additionally or alternatively, the step of covering at least the tip and a portion of the tapering end face of the first tapering end of the one or more pultrusions with a first portion of one or more protective fibre layers may comprise:
   positioning a resin barrier between the first portion of the one or more protective fibre layers and the second portion of the one or more protective fibre layers, and wherein the resin barrier prevents the second resin from reaching the second portion of the one or more protective fibre layers during infusion with the second resin material.

Such a dry portion of the one or more protective fibre layers may provide the advantage of being flexible and thus not susceptible to damage upon contact with a foreign object. The dry portion may also provide the advantage of enabling a strong joint upon subsequent inclusion of the main laminate into a wind turbine blade since the dry portion may be infused and cured along with a shell of the wind turbine blade.

Additionally or alternatively, the method may further comprise a step of:
   after curing the pultrusion arrangement together via the second resin, cutting an end of the second portion of the one or more protective fibre layers located at a distance away from the taper tip of the first tapering end, optionally at the third assembly station.

Cutting the end of the protective fibre layers may allow discarding a damaged end of the protective fibre layers while still providing a good joint and/or the provision of a sharp cut line at a desired location may ensure some leeway in handling.

Additionally or alternatively, the method may comprise a step of, after curing or potentially cutting, grinding the taper tip of the first tapering end of the pultrusion arrangement to an end step thickness in the range of 0.0 mm to 0.5 mm.

Additionally or alternatively, the method may further comprise the steps of:
   placing the pultrusion arrangement or the main laminate onto one or more shell fibre layers positioned on a mould surface of a blade shell mould at a third assembly station,
   infusing the pultrusion arrangement or the main laminate, and the one or more shell fibre layers with a third resin material, curing the pultrusion arrangement or the main laminate, and the one or more shell fibre layers together via the third resin material to provide a wind turbine shell part, wherein the cured pultrusion arrangement or main laminate forms a load carrying structure of the wind turbine blade part and the cured shell fibre layers provide the aerodynamic shape of the wind turbine blade part.

Additionally or alternatively, the cured pultrusion arrangement or main laminate may form a spar cap of the wind turbine shell part.

Additionally or alternatively, the method may further comprise a step of:

placing one or more inner fibre layers on the one or more shell fibre layers and the pultrusion arrangement or the main laminate to provide a scarf joint at the pultrusion root end of the pultrusion arrangement or main laminate and/or at the pultrusion tip end of the pultrusion arrangement, wherein the one or more inner fibre layers are infused and cured together with the third resin material to form the wind turbine shell part.

Additionally, the scarf joint may be provided between the one or more protective fibre layers and the one or more inner fibre layers.

A second aspect of this disclosure relates to a wind turbine blade extending along a spanwise axis from a blade root through a root region and an airfoil region to a tip region with the blade tip, the wind turbine blade comprising a pressure side, a suction side and a chord line extending between a leading edge and a trailing edge, the wind turbine blade comprising a main laminate forming a load carrying structure of the wind turbine blade and extending in a longitudinal direction between a pultrusion root end and a tip pultrusion end, the main laminate comprising one or more pultrusions arranged in one layer or more stacked layers including at least a bottom layer and cured together via a second resin material.

wherein the one or more pultrusion include(s) a first tapering end with a tapering end face terminating in a taper tip forming the pultrusion root end of the main laminate, and/or the one or more pultrusion include(s) a second tapering end with a tapering end face terminating in a taper tip forming the pultrusion tip end of the main laminate.

wherein at least the taper tip and a portion of the tapering end face of the first tapering end is covered by one or more protective fibre layers cured together with the one or more pultrusions via the second resin material.

Additionally, the wind turbine blade may comprise a shell providing the aerodynamic shape of the wind turbine blade and comprising one or more cured shell fibre layers.

Additionally or alternatively, the one or more protective fibre layers and the one or more pultrusions may form a scarf joint at the pultrusion root end and/or at the pultrusion tip end.

Additionally or alternatively, the one or more protective fibre layers may comprise biaxial fibres, preferably arranged +/−45 degrees relative to the longitudinal direction.

Alternatively, the fibres of the one or more protective fibre layers may be randomly oriented. Additionally or alternatively, the one or more protective fibre layers may comprise glass fibres.

A third aspect of this disclosure relates to a wind turbine blade obtainable by a method according to the first aspect.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION OF THE INVENTION in the following figure description, the same reference numbers refer to the same elements and may thus not be described in relation to all figures.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub 8, and a trailing edge 20 facing the opposite direction of the leading edge 18.

Figure 1:
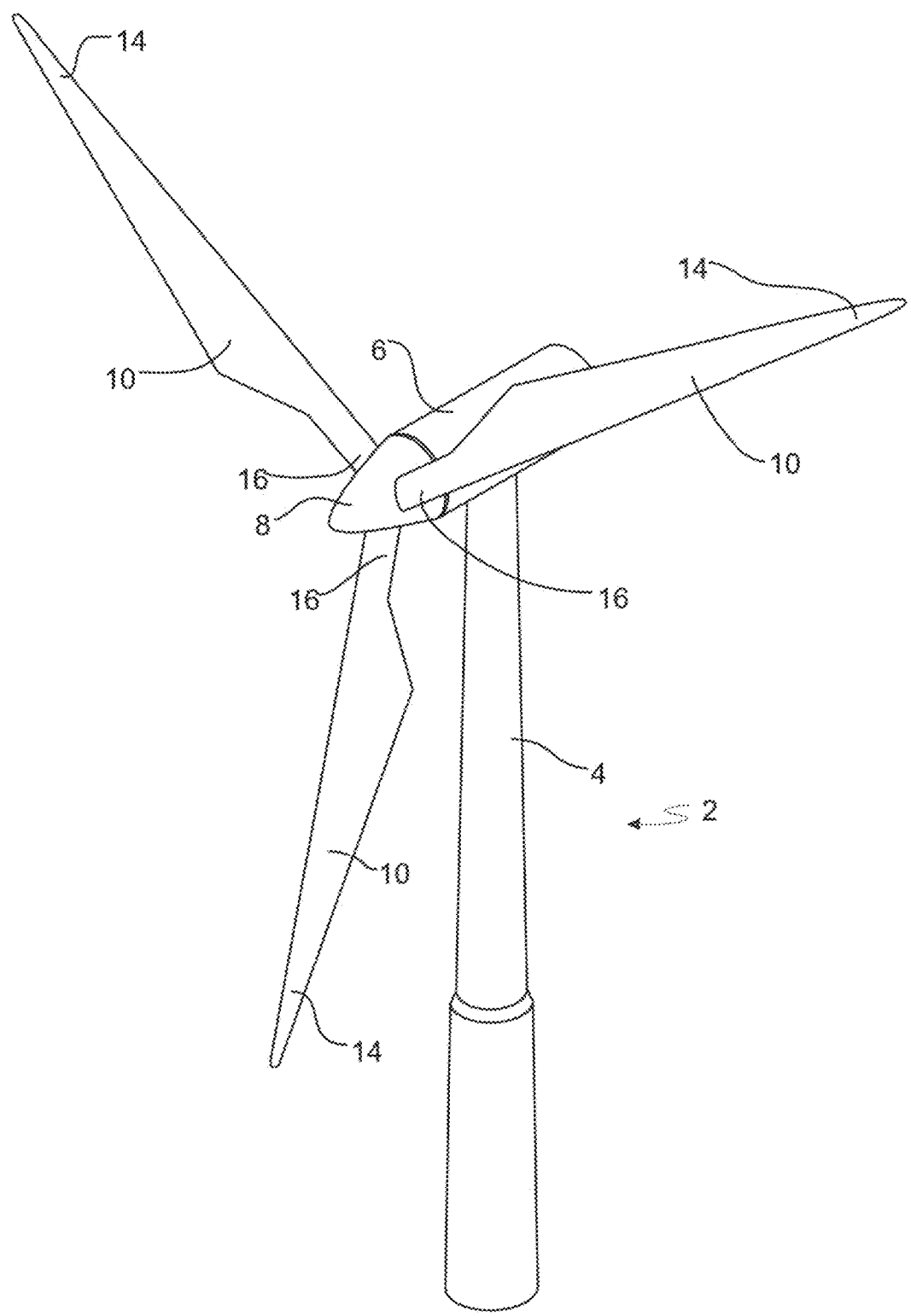
FIG. 1 is a schematic diagram illustrating a perspective view of an exemplary wind turbine.
Figure 2:
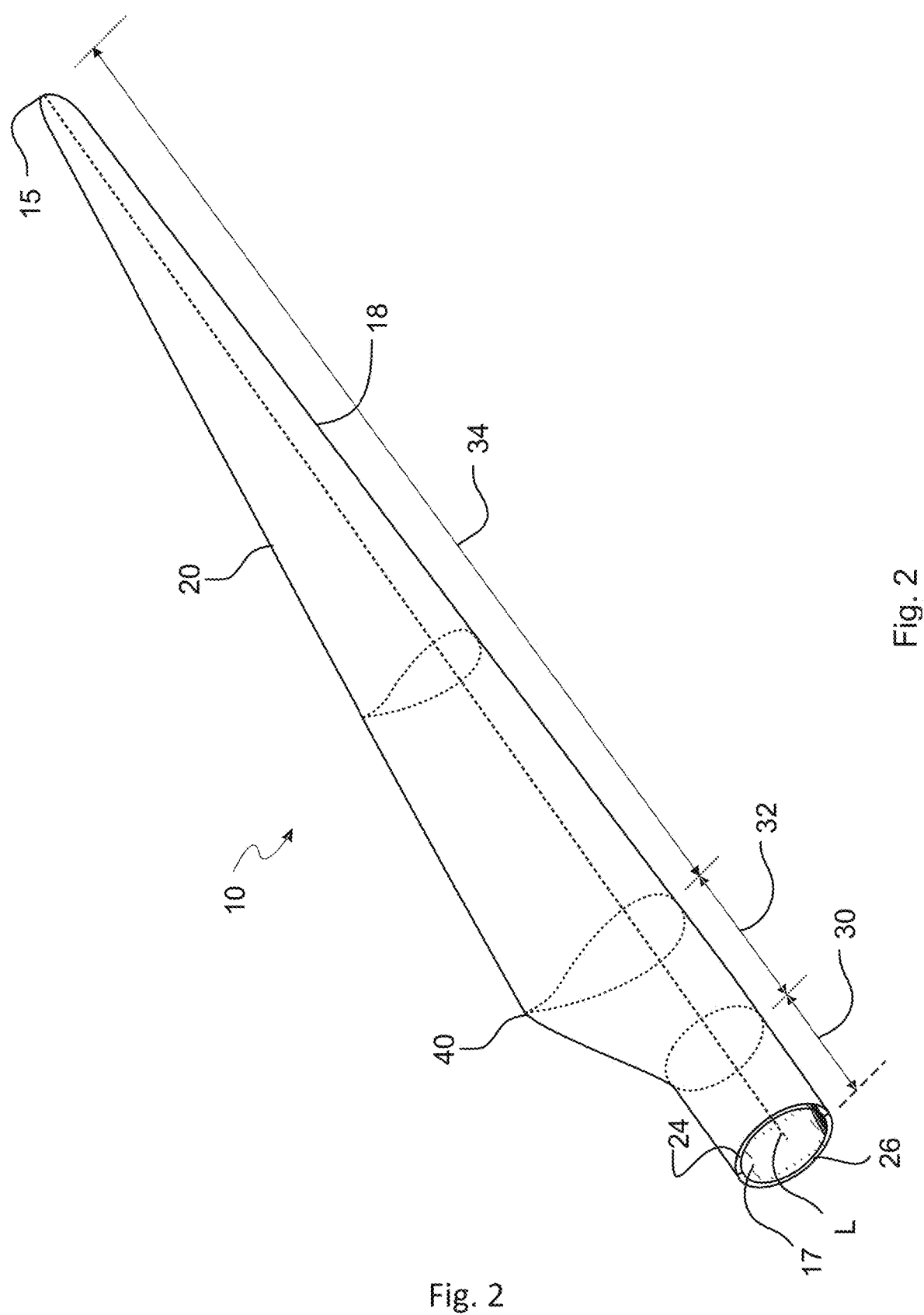
FIG. 2 is a schematic diagram illustrating a perspective view of an exemplary wind turbine blade.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints extending along the trailing edge 20 and the leading edge 18 of the blade 10. Typically, the pultrusion root ends of the blade shell parts 24, 26 have a semi-circular or semi-oval outer cross-sectional shape. The blade shell parts 24, 26 define the aerodynamic shape of the wind turbine blade but require a main laminate to have the load carrying structure to support the weight of the wind turbine blade.

Figure 3:
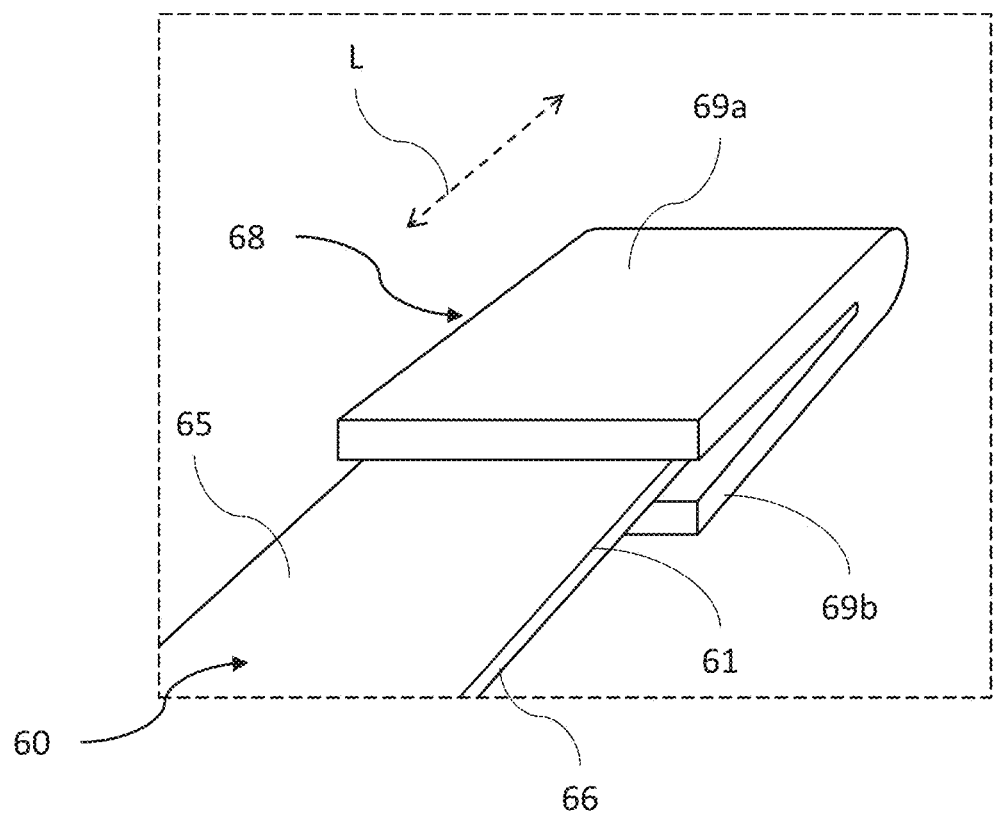
FIG. 3 is a schematic diagram illustrating a perspective view of an exemplary pultrusion with an end cap.

A method for manufacturing such a wind turbine blade is hereinafter described. Firstly, a number of individual pultrusions 60 in the form of pultrusion planks are provided. Each pultrusion 60 comprises a top face 65 and a bottom face 66 extending between a first tapering end 61 and a second tapering end 62. The first tapering end 61 has a tapering end face 63 terminating in a taper tip 64, and the second tapering end 62 has a tapering end face 63 terminating in a taper tip 64 similar to the first tapering end 61. The ends 61, 62 of the pultrusions are best seen cross-sectionally in FIG. 5. As shown in FIG. 3, the first tapering end 61 of each pultrusion 60 is provided with a V-shaped end cap 68 of a resilient foam material covering the tapering end face 63 and the taper tip 64. A top part 69a of the end cap 68 forms one side of the V shape and extends along a distance of the top face 65, and a bottom part 69b of the end cap 68 forms the other side of the V shape and extends a distance along the bottom face 66. The end cap 68 thus protects the fragile taper tip 64.

Figure 4:
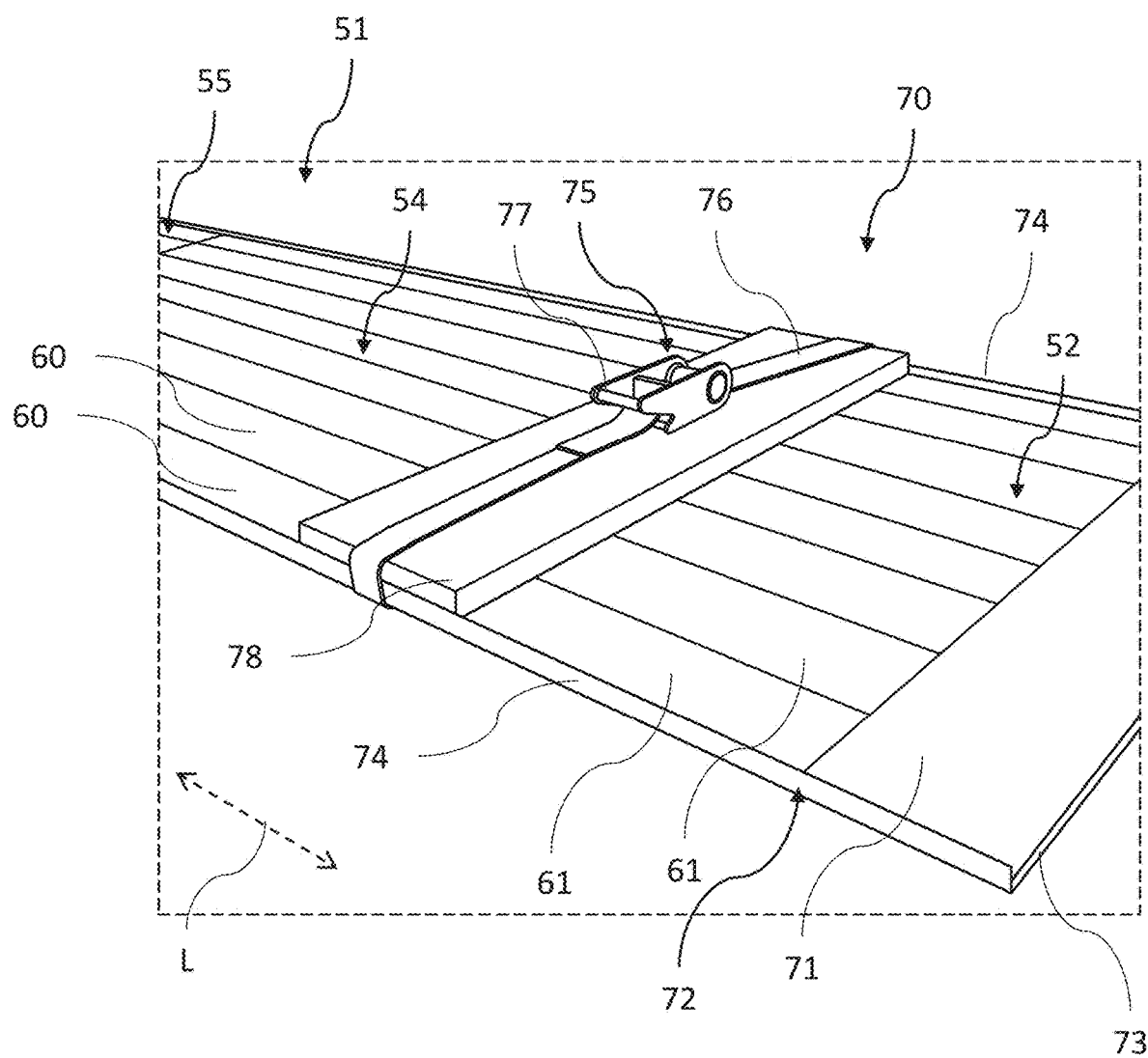
FIG. 4 is a schematic diagram illustrating a perspective view of an exemplary pultrusion arrangement arranged on a tray.
Figure 5:
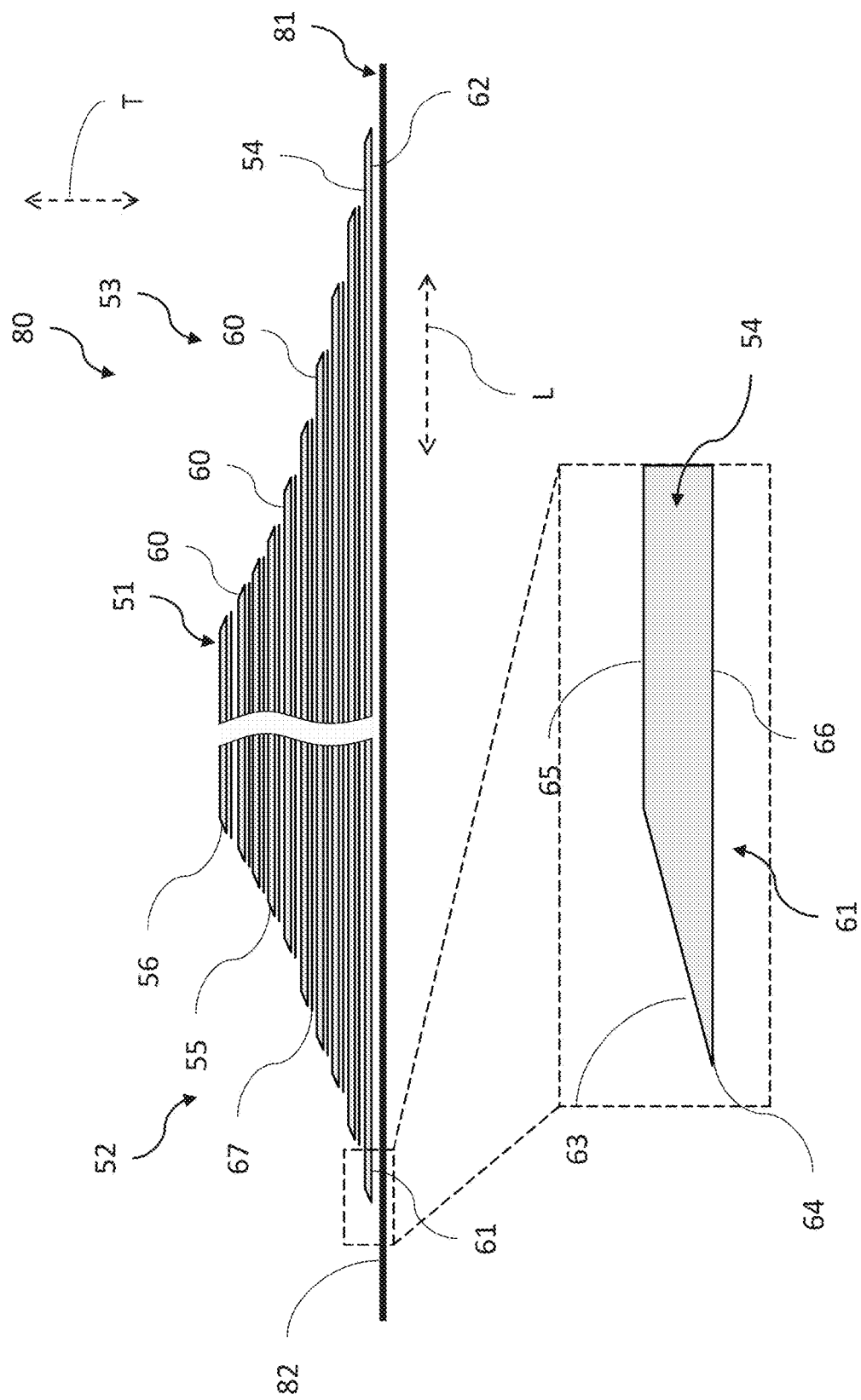
FIG. 5 is a schematic diagram illustrating a cross-sectional view of an exemplary pultrusion arrangement in a main laminate mould.

The pultrusions 60 are transferred to a first assembly station 70 including a tray 72 comprising a rectangular base with a rectangular first assembly surface 71 bordered by two parallel open tray ends and two parallel tray walls 74 protruding from the sides of the first assembly surface 71. The pultrusions 60 are arranged side-by-side in a bottom layer 54 on the first assembly surface 71 of the tray 72 as seen in FIG. 4. Several intermediate layers 55 of pultrusions 60 separated by interlayers 67 are then stacked on top of the bottom layer 54 and lastly a top layer 56 in a thickness direction T thus providing a pultrusion arrangement 51 extending in a longitudinal direction L between a pultrusion root end 52 and a pultrusion tip end 53 as best seen in FIG. 5. The pultrusions 60 are fixed by several fixing devices 75 comprising a resilient block 78 placed on the pultrusions 60, a strap 76 extending around the tray and strapping down the block 78, and a tightening mechanism 77 allowing the strap 76 to be securely tightened. The end caps 68 are removed from the first tapering end 61 while the pultrusions 60 are positioned on the first assembly surface 71 so that the first tapering end 61 of each pultrusion 60 is supported by the first assembly surface 71 at a distance from an end 73 of the tray 72 and between the tray walls 74 to arrive at the arrangement shown in FIG. 4. This allows the pultrusion arrangement 51 to be securely fixed on the tray thus protecting the fragile taper tip 64 of each pultrusion 60 while allowing handling of the pultrusion arrangement 51. It is desired to reach a very thin end step thickness of the taper tip 64 in the range of 0.0 mm to 0.5 mm. This may be achieved by providing each pultrusion with such a taper tip 64 or by providing them with a thicker tip which is then grinded to the desired end step thickness.

The tray 72 including pultrusion arrangement 51 is then lifted to a second assembly station 80 including a main laminate mould 81 with a mould surface 82. The pultrusion arrangement 51 is then transferred onto the mould surface 82. The pultrusion arrangement 51 is then infused with a second resin material comprising vinyl ester in the main laminate mould 81, and subsequently cured together via the second resin material to provide a main laminate via a vacuum assisted resin transfer moulding process. The main laminate 50 is then transferred to a third assembly station as described in connection with FIGS. 7-8.

Figure 6:
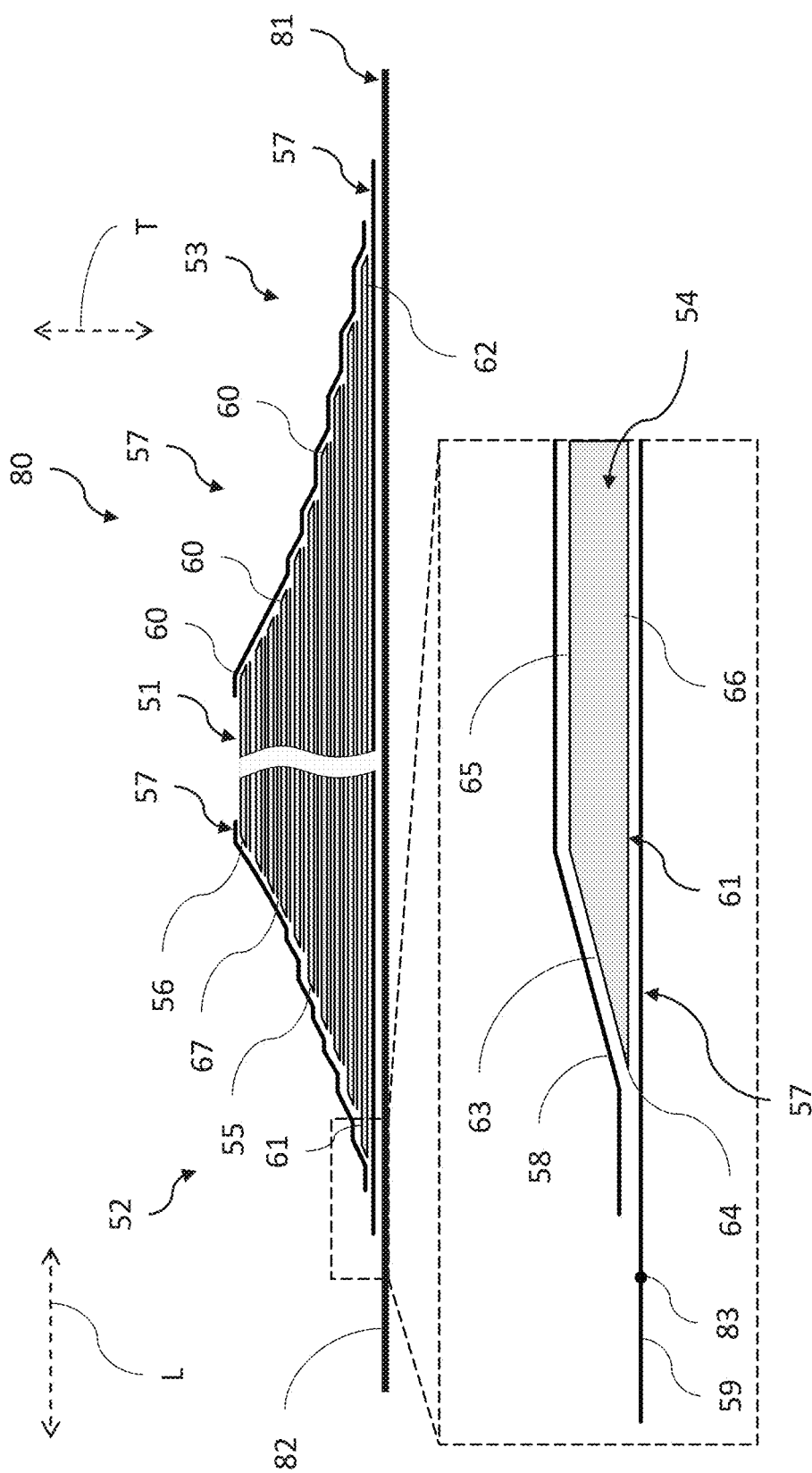
FIG. 6 is a schematic diagram illustrating a cross-sectional view of the exemplary pultrusion arrangement of FIG. 5 with a protective fibre layer.

Alternatively, at the second assembly station 80 and as best seen in FIG. 6, the pultrusion arrangement 51 is transferred onto a first portion 58 of one or more protective carbon fibre layers 57 on the mould surface 82 and the first portion 58 of one or more protective carbon fibre layers 57 is applied to cover the entire the pultrusion root end 52 and the pultrusion tip end 53 including the tapering end face 63 and taper tip 64 of both tapering ends 61, 62. The one or more protective fibre layers 57 comprises biaxial carbon fibres arranged 41-45 degrees relative to the longitudinal direction L of the pultrusion arrangement 51. A resin barrier 83, e.g. provided by omitting a resin distribution layer in the second portion 59, is placed to separate the first portion 58 from a second portion 59 of the one or more protective fibre layers 57. The second portion 59 extends at a distance from the taper tip 64 away from the first tapering end of the pultrusions 60 in the bottom layer 54. The pultrusion arrangement 51 and protective fibre layers 57 are then infused with a second resin material comprising vinyl ester in the main laminate mould 81 via a vacuum assisted resin transfer moulding process, and subsequently cured together via the second resin material to provide a main laminate integrated with the one or more protective fibre layers 57. The second portion 59 can be cut to a desired length. The main laminate 50 is then transferred to a third assembly station 90 as described in connection with FIGS. 7-8.

Figure 7:
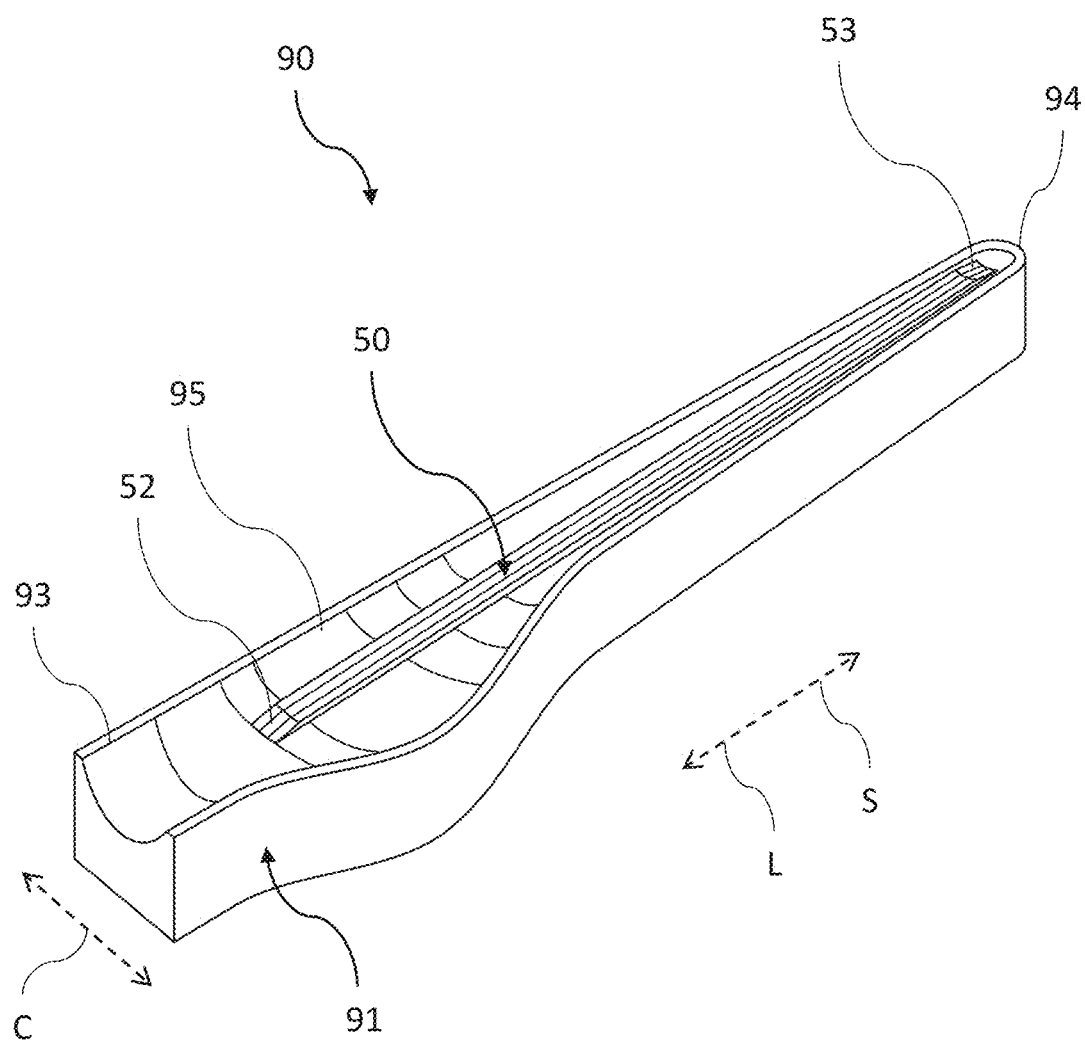
FIG. 7 is a schematic diagram illustrating a perspective view of an exemplary main laminate in a blade shell mould.
Figure 8:
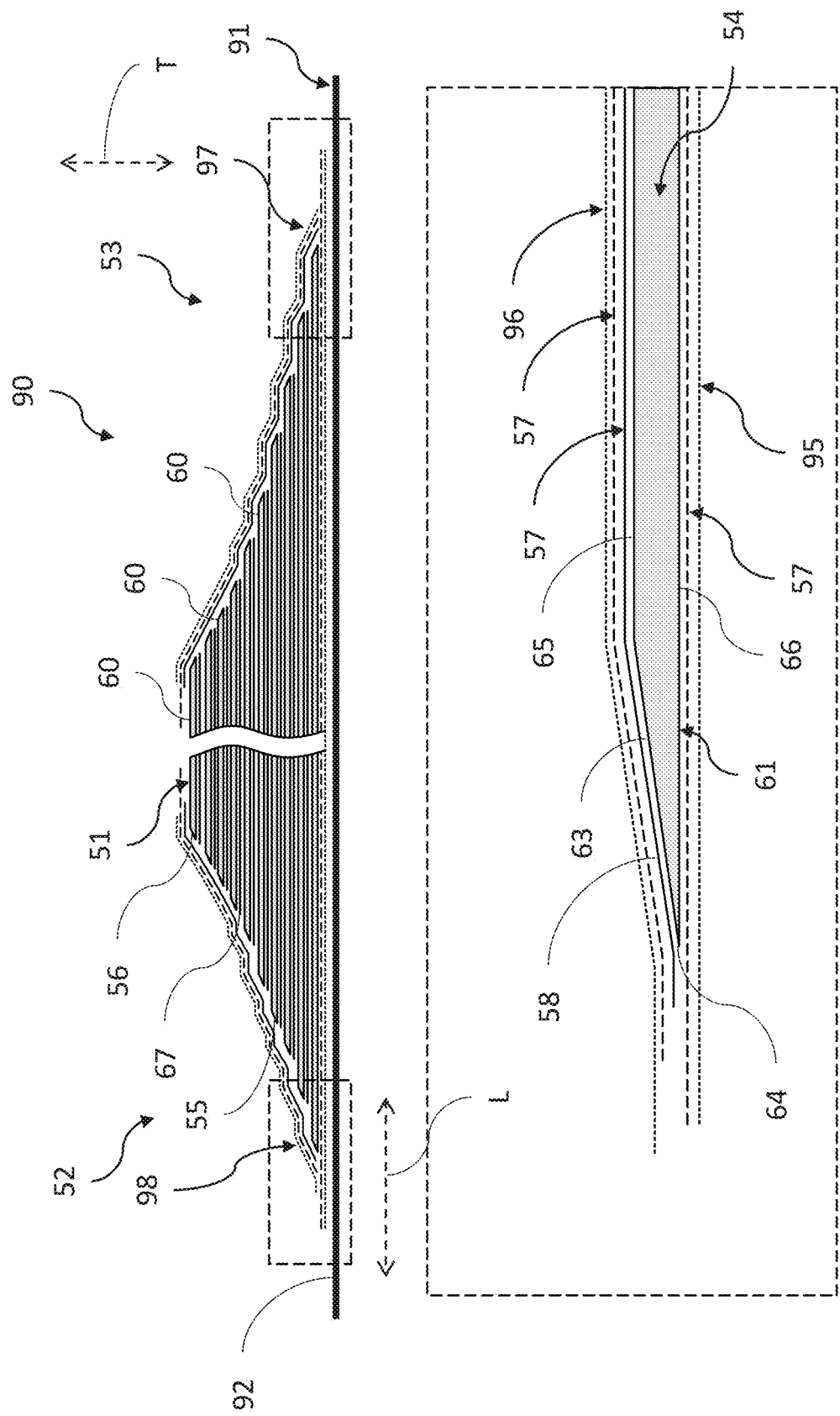
FIG. 8 is a schematic diagram illustrating a cross-sectional view of the exemplary main laminate of FIG. 7 with a protective fibre layer in the blade shell mould.

As best seen in FIGS. 7-8, a blade shell mould 91 with a mould surface 92 for moulding a wind turbine blade shell half is located at the third assembly station 90. The main laminate 50 either with or without integrated protective fibre layers 57 is lowered onto one or more shell glass fibre layers 95 positioned on a mould surface 92. One or more inner glass fibre layers 96 are then placed on the one or more shell glass fibre layers 95 and the main laminate 50 to configure a tip scarf joint 97 and a root scarf joint 98 at the pultrusion root end 52 and the pultrusion tip end 53, respectively. The main laminate 50, the one or more glass shell fibre layers 95, and the one or more inner glass fibre layers 96 are then infused with a third resin material comprising polyester in the blade shell mould 91 via a vacuum assisted resin transfer moulding process, and subsequently cured together via the third resin material to provide a wind turbine blade shell half with an integrated spar cap comprising the main laminate 50 for being combined with another half to provide a wind turbine blade.

LIST OF REFERENCES 2 wind turbine
4 tower
6 nacelle
8 hub
10 blade
11 root blade segment
11a joint end
12 Up blade segment
12a joint end
13 shell
14 blade tip
15 tip end
16 blade root
17 root end
18 leading edge
20 trailing edge
24 pressure side
26 suction side
30 root region
32 transition region
34 airfoil region
40 shoulder
50 main laminate
51 pultrusion arrangement
52 pultrusion root end
53 pultrusion tip end
54 bottom layer
55 intermediate layer
56 top layer
57 protective fibre layer
58 first portion
59 second portion
60 pultrusion
61 first tapering end
62 second tapering end
63 tapering end face
64 taper tip
65 top face
66 bottom face
67 interlayer
68 end cap
69a top part
69b bottom part
70 first assembly station
71 first assembly surface
72 tray
73 tray end
74 tray wall
75 fixing device
76 strap
77 strap tightening mechanism
78 block
80 second assembly station
81 main laminate mould
82 mould surface
83 resin barrier
90 third assembly station
91 blade shell mould
92 mould surface
93 root end
94 tip end
95 shell fibre layer
96 inner fibre layer
97 tip scarf joint
98 root scarf joint
S spanwise axis
C chordwise direction
L longitudinal direction
T thickness direction

The invention claimed is:

1. A method for manufacturing a wind turbine blade extending along a spanwise axis from a blade root through a root region and an airfoil region to a tip region with a blade tip, the wind turbine blade comprising a pressure side, a suction side and a chord line extending between a leading edge and a trailing edge, the wind turbine blade comprising a shell providing the aerodynamic shape of the wind turbine blade and a main laminate forming a load carrying structure of the wind turbine blade, comprising the steps of:
providing one or more individual pultrusions having a first tapering end with a tapering end face terminating in a taper tip;
covering the first tapering end of the one or more pultrusions with an end cap;
arranging the one or more pultrusions in one layer or a plurality of stacked layers including at least a bottom layer on a first assembly surface at a first assembly station to provide a pultrusion arrangement extending in a longitudinal direction between a pultrusion root end and a pultrusion tip end, wherein the first tapering end of the one or more pultrusions forms the pultrusion root end or the pultrusion tip end of the pultrusion arrangement; and
removing the end cap from the first tapering end of the one or more pultrusions while the one or more pultrusions are on the first assembly surface.

2. The method according to claim 1, wherein the end cap comprises a foam material.

3. The method according to claim 1, wherein the one or more pultrusions comprise a plurality of pultrusions, wherein a plurality of end caps are provided, and the method further comprising the step of covering the first tapering end of each of the pultrusions with a corresponding one of the end caps.

4. A wind turbine blade manufactured according to the method of claim 1.

5. A method for manufacturing a wind turbine blade extending along a spanwise axis from a blade root through a root region and an airfoil region to a tip region with a blade tip, the wind turbine blade comprising a pressure side, a suction side and a chord line extending between a leading edge and a trailing edge, the wind turbine blade comprising a shell providing the aerodynamic shape of the wind turbine blade and a main laminate forming a load carrying structure of the wind turbine blade, comprising the steps of:
providing one or more individual pultrusions including a first tapering end with a tapering end face terminating in a taper tip; and arranging the one or more pultrusions in one layer or a plurality of stacked layers including at least a bottom layer onto a first assembly surface forming part of a tray at a first assembly station to provide a pultrusion arrangement extending in a longitudinal direction between a pultrusion root end and a pultrusion tip end, wherein the tapering end of the one or more pultrusions is/are supported by the first assembly surface of the tray at a distance from an end of the tray, wherein the first assembly surface is flat.

6. The method according to claim 5, wherein the tray comprises two walls protruding from the first assembly surface on each side of the pultrusion arrangement along the length of the one or more pultrusions so as to keep the pultrusion arrangement on the tray.

7. A method for manufacturing a wind turbine blade extending along a spanwise axis from a blade root through a root region and an airfoil region to a tip region with a blade tip, the wind turbine blade comprising a pressure side, a suction side and a chord line extending between a leading edge and a trailing edge, the wind turbine blade comprising a shell providing an aerodynamic shape of the wind turbine blade and a main laminate forming a load carrying structure of the wind turbine blade, the method comprising the steps of:
providing one or more individual pultrusions having a first tapering end with a tapering end face terminating in a taper tip, wherein the one or more pultrusions comprise a first cured resin material;
arranging the one or more pultrusions in one layer or a plurality of stacked layers including at least a bottom layer on a first assembly surface forming part of a tray at a first assembly station to provide a pultrusion arrangement extending in a longitudinal direction between a pultrusion root end and a pultrusion tip end, wherein the first tapering end of the one or more pultrusions forms the pultrusion root end or the pultrusion tip end of the pultrusion arrangement;
transferring the pultrusion arrangement from the first assembly surface of the tray onto a main laminate mould surface of a main laminate mould at a second assembly station;
infusing the pultrusion arrangement with a second resin material in the main laminate mould; and
curing the pultrusion arrangement together via the second resin material to provide a main laminate.

8. The method according to claim 7, further comprising:
covering at least the taper tip and a portion of the tapering end face of the first tapering end of the one or more pultrusions in the bottom layer with a first portion of one or more protective fibre layers so that the one or more protective fibres form part of the pultrusion arrangement.

9. The method according to claim 8, wherein a second portion of the one or more protective fibre layers extends from the taper tip of the first tapering end of the one or more pultrusions in the bottom layer away from the first tapering end of the one or more pultrusions in the bottom layer.

10. The method according to claim 8, wherein the pultrusion arrangement and at least a first portion of the one or more protective fibre layers is infused with a second resin material in a main laminate mould, and the pultrusion arrangement and the one or more protective fibre layers is cured together via the second resin material to provide a main laminate integrated with the one or more protective fibre layers.

11. The method according to claim 10, wherein the step of covering at least the tip and the portion of the tapering end face of the first tapering end of the one or more pultrusions with the first portion of one or more protective fibre layers comprises:
positioning a resin barrier between the first portion of the one or more protective fibre layers and the second portion of the one or more protective fibre layers, and wherein the resin barrier prevents the second resin material from reaching the second portion of the one or more protective fibre layers during infusion with the second resin material.

12. The method according to claim 11, the method further comprises:
after curing the pultrusion arrangement together via the second resin material, cutting an end of the second portion of the one or more protective fibre layers located at a distance away from the taper tip of the first tapering end.

13. The method according to claim 11, further comprising the steps of:
placing the pultrusion arrangement or the main laminate onto one or more shell fibre layers positioned on a mould surface of a blade shell mould at a third assembly station;
infusing the pultrusion arrangement or the main laminate, and the one or more shell fibre layers with a third resin material; and
curing the pultrusion arrangement or the main laminate, and the one or more shell fibre layers together via the third resin material to provide a wind turbine shell part, wherein the cured pultrusion arrangement or main laminate forms a load carrying structure of the wind turbine blade part and the cured shell fibre layers provide the aerodynamic shape of the wind turbine blade part.

14. The method according to claim 13, wherein the load-carrying structure is a spar cap.

15. The method according to claim 13, wherein the step of infusing the pultrusion arrangement or the main laminate, and the one or more shell fibre layers with a third resin material comprises infusing the second portion of the one or more protective fibre layers with the third resin material and the step of curing the pultrusion arrangement or the main laminate, and the one or more shell fibre layers together via the third resin material to provide a wind turbine shell part comprises curing the second portion of the one or more protective fibre layers.

16. The method according to claim 15, further comprising:
placing one or more inner fibre layers on the one or more shell fibre layers and the pultrusion arrangement or the main laminate to provide a scarf joint at the pultrusion root end of the pultrusion arrangement or main laminate and/or at the pultrusion tip end of the pultrusion arrangement, wherein the one or more inner fibre layers are infused and cured together with the third resin material to form the wind turbine shell part.

17. The method according to claim 8, wherein the one or more protective fibre layers do not cover a top side of the pultrusion arrangement.

18. A wind turbine blade extending along a spanwise axis from a blade root through a root region and an airfoil region to a tip region with a blade tip, the wind turbine blade comprising a pressure side, a suction side and a chord line extending between a leading edge and a trailing edge, the wind turbine blade comprising a main laminate forming a load carrying structure of the wind turbine blade and extending in a longitudinal direction between a pultrusion root end and a tip pultrusion end, the main laminate comprising one or more pultrusions each comprising a first cured resin material, wherein the one or more pultrusions are arranged in one layer or a plurality of stacked layers including at least a bottom layer and cured together via a second resin material, wherein the one or more pultrusions include a first tapering end with a tapering end face terminating in a taper tip forming the pultrusion root end of the main laminate, and/or the one or more pultrusions include a second tapering end with a tapering end face terminating in a taper tip forming the pultrusion tip end of the main laminate, and wherein at least the taper tip and a portion of the tapering end face of the first tapering end is covered by one or more protective fibre layers cured together with the one or more pultrusions via the second resin material.

19. The wind turbine blade according to claim 18, wherein the one or more protective fibre layers and the one or more pultrusions form a scarf joint at the pultrusion root end and/or at the pultrusion tip end.

* * * * *